(12) United States Patent
Kassar et al.

(10) Patent No.: US 12,233,902 B2
(45) Date of Patent: Feb. 25, 2025

(54) SYSTEMS AND METHODS FOR DETERMINING STEER WHILE STOPPED BEHAVIOR FOR A VEHICLE USING DYNAMIC LIMITS

(71) Applicant: FORD GLOBAL TECHNOLOGIES, LLC, Dearborn, MI (US)

(72) Inventors: Alice Kassar, Detroit, MI (US); Jing Huang, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 191 days.

(21) Appl. No.: 18/057,291

(22) Filed: Nov. 21, 2022

(65) Prior Publication Data

US 2024/0166231 A1    May 23, 2024

(51) Int. Cl.
*B60W 60/00* (2020.01)
*B60W 40/02* (2006.01)

(52) U.S. Cl.
CPC .......... *B60W 60/001* (2020.02); *B60W 40/02* (2013.01); *B60W 2520/06* (2013.01); *B60W 2520/10* (2013.01); *B60W 2554/80* (2020.02)

(58) Field of Classification Search
CPC ............. B60W 30/09; B60W 30/0953; B60W 30/18054; B60W 40/02; B60W 60/001; B60W 2520/06; B60W 2520/10; B60W 2554/20; B60W 2554/80; B60W 2710/207
USPC .......................................................... 701/23
See application file for complete search history.

(56) References Cited

U.S. PATENT DOCUMENTS

| | | | | |
|---|---|---|---|---|
| 9,499,197 | B2 * | 11/2016 | Tan | B62D 6/00 |
| 10,656,651 | B2 * | 5/2020 | Ozawa | B60W 10/184 |
| 11,142,246 | B2 * | 10/2021 | Fujii | G05D 1/0246 |
| 11,780,502 | B2 * | 10/2023 | Fujii | B62D 6/003 |
| | | | | 701/42 |
| 2013/0179036 | A1 * | 7/2013 | Lee | B62D 15/0255 |
| | | | | 701/41 |
| 2014/0229068 | A1 * | 8/2014 | Ueyama | B60W 10/20 |
| | | | | 701/41 |
| 2015/0259006 | A1 * | 9/2015 | Inoue | B62D 15/025 |
| | | | | 701/41 |

(Continued)

FOREIGN PATENT DOCUMENTS

GB    2590951 A  *  7/2021 ............ B60W 30/12

*Primary Examiner* — Atul Trivedi
(74) *Attorney, Agent, or Firm* — Frank A. MacKenzie; Brooks Kushman P.C.

(57) ABSTRACT

This document discloses system, method, and computer program product embodiments for operating a vehicle. For example, the method includes: obtaining a vehicle trajectory and a location of an object in an environment; generating a margin comprising a first vehicle trajectory indicating a series of locations of the vehicle while contacting the object, a boundary of a drivable area or lane mark during a time interval in which the vehicle will travel past the object; generating a reachable boundary using a condition of the vehicle, a longitudinal speed profile and steering limits of the vehicle; comparing the reachable boundary and the margin; and concluding that the vehicle should steer while stopped when the reachable boundary is at any point within a threshold distance from the margin or that the vehicle should not steer while stopped when the reachable boundary is at no point within the threshold distance from the margin.

18 Claims, 14 Drawing Sheets

(56) References Cited

U.S. PATENT DOCUMENTS

| | | | |
|---|---|---|---|
| 2018/0113455 A1* | 4/2018 | Iagnemma | B62D 15/0285 |
| 2018/0281804 A1* | 10/2018 | Talamonti | B60K 35/00 |
| 2019/0061811 A1* | 2/2019 | Odate | B62D 5/0463 |
| 2019/0179330 A1* | 6/2019 | Oniwa | G08G 1/16 |
| 2020/0010088 A1* | 1/2020 | Kokaki | B60W 30/188 |
| 2020/0324795 A1* | 10/2020 | Bojarski | G06V 10/764 |
| 2020/0406969 A1* | 12/2020 | Ersal | B60W 10/184 |
| 2021/0046936 A1* | 2/2021 | Umeda | B60W 10/20 |
| 2021/0061350 A1* | 3/2021 | Kinoshita | B60W 10/18 |
| 2021/0122373 A1* | 4/2021 | Dax | B60W 30/18159 |
| 2021/0146919 A1* | 5/2021 | Xu | G08G 1/0112 |
| 2021/0146943 A1* | 5/2021 | Oniwa | B60R 21/00 |
| 2021/0146954 A1* | 5/2021 | Kaji | B60W 30/143 |
| 2021/0229656 A1* | 7/2021 | Dax | G08G 1/096811 |
| 2021/0276588 A1* | 9/2021 | Kabzan | B60W 10/04 |
| 2021/0370921 A1* | 12/2021 | Silva | B60W 60/0027 |
| 2022/0063651 A1* | 3/2022 | Dai | B60W 60/001 |
| 2022/0111866 A1* | 4/2022 | Carroll | B60W 60/0016 |
| 2022/0135074 A1* | 5/2022 | Armstrong-Crews | G06V 20/58 701/23 |
| 2022/0137227 A1* | 5/2022 | Armstrong-Crews | B60W 30/0956 701/26 |
| 2022/0194424 A1* | 6/2022 | Li | B60W 30/09 |
| 2022/0348227 A1* | 11/2022 | Foster | G06V 20/588 |
| 2023/0311886 A1* | 10/2023 | Kato | B60W 30/18163 701/23 |
| 2023/0311979 A1* | 10/2023 | Dairokuno | B62D 6/003 180/446 |
| 2023/0316778 A1* | 10/2023 | Kato | B60W 10/20 701/25 |
| 2023/0331231 A1* | 10/2023 | Mujumdar | B60W 60/001 |

\* cited by examiner

SYSTEMS AND METHODS FOR DETERMINING STEER WHILE STOPPED BEHAVIOR FOR A VEHICLE USING DYNAMIC LIMITS

BACKGROUND

During operation an autonomous vehicle (AV) may stop in proximity to the detected object. The AV may need to steer while stopped (SWS) to facilitate veering around the object. When reasoning about SWS, current systems only consider the AV's relative position to the obstacle. The AV's wheel angle may be changed based on the SWS reasoning. The AVs wheel angle and/or orientation may make it difficult to veer around the obstacle.

SUMMARY

The present disclosure concerns implementing systems and methods for operating a vehicle. The methods comprise: obtaining, by a processor, a vehicle trajectory for the vehicle and a location of an object in an environment; generating, by a processor, a margin comprising a first vehicle trajectory indicating a series of locations of the vehicle while contacting the object, a boundary of a drivable area or lane mark during a time interval in which the vehicle will travel past the object; generating, by the processor, a reachable boundary using a condition of the vehicle, a longitudinal speed profile and steering limits of the vehicle (wherein the reachable boundary comprises a second vehicle trajectory indicating a series of locations of the vehicle while traveling in a forward direction with a certain speed and using full steering limits); and comparing, by the processor, the reachable boundary and the margin. A conclusion is made that the vehicle should steer while stopped when the reachable boundary is at any point within a threshold distance from the margin. A conclusions is made that the vehicle should not steer while stopped when the reachable boundary is at no point within the threshold distance from the margin.

The implementing systems can comprise: a processor; and a non-transitory computer-readable storage medium comprising programming instructions that are configured to cause the processor to implement a method for operating a vehicle. The above-described methods can also be implemented by a computer program product comprising memory and programming instructions that are configured to cause a processor to perform operations.

BRIEF DESCRIPTION OF THE DRAWINGS

The accompanying drawings are incorporated into this document and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
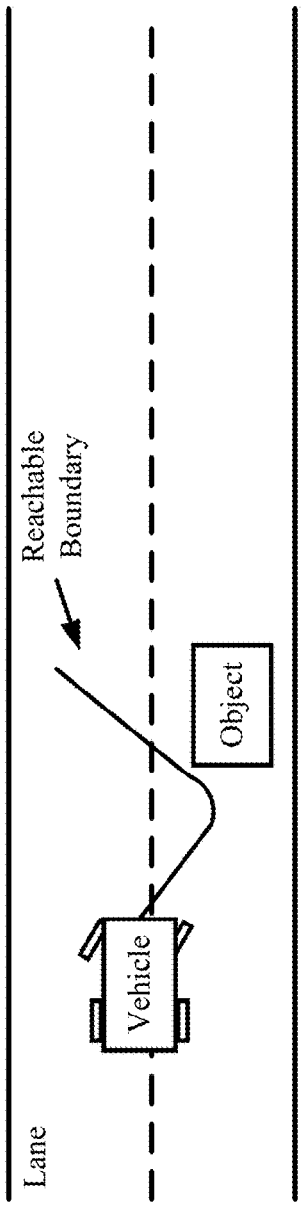
FIGS. 1-2 each illustrate a reachable boundary.
Figure 2:
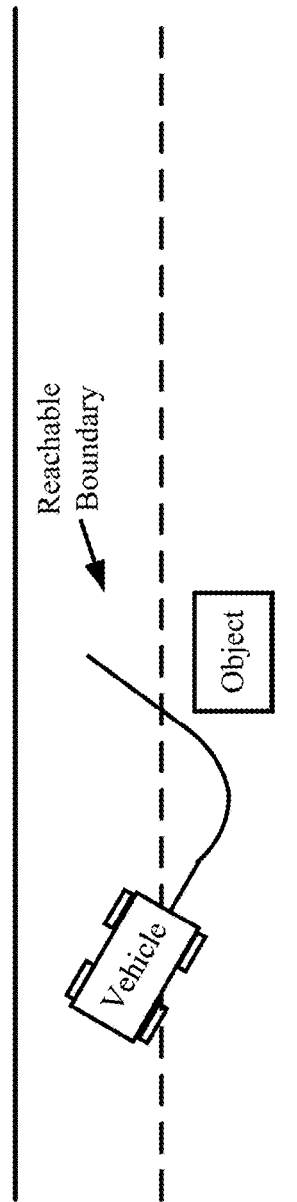

This document describes system, apparatus, device, method and/or computer program product embodiments, and/or combinations and sub-combinations of any of the above, for determining whether an AV should steer while remaining stopped in order to go around an object in front of the AV. This determination of the present solution is made using the AV's position, orientation, wheel angle and AV dynamic limits. By considering other factors in addition to the AV's position, the present solution overcomes the drawbacks of the conventional solutions, and is therefore able to have an improved performance in certain scenarios. For example, the present solution has an improved performed in scenarios where: the AV's center axis is aligned with (i.e., angled zero degrees relative to) a reference path and the AV's wheel angle is angled forty-five degrees relative to the reference path as shown in FIG. 1; and/or the AV's center axis is angled forty-five degrees relative to the reference path and the AV's wheel angle is aligned with (i.e., angled zero degrees relative to) the reference path as shown in FIG. 2.

The present solution generally involves constructing a reachable boundary from the AV stop condition and the AV's steering limits given a longitudinal speed profile. The AV stop condition is defined by a position, an orientation relative to a reference path and a wheel angle relative to a reference path. Illustrative reachable boundaries for the above-mentioned scenarios are shown in FIGS. 1-2. The reachable boundary approach may generate a left reachable boundary and a right reachable boundary for the AV. Both reachable boundaries may start from the AV's initial heading and wheel angle. Each reachable boundary represents how much to the left or right the AV can veer when using full steering limits under the initial condition. The left reachable boundary is used for a collision check when the object is located on the right side of the AV, and the right reachable boundary is used for collision check when the object is located on the left side of the AV.

The methods involve: obtaining a vehicle trajectory for the vehicle and a location of an object in an environment; generating a margin comprising a first vehicle trajectory indicating a series of locations of the vehicle while contacting the object, a boundary of a drivable area or lane mark during a time interval in which the vehicle will travel past the object; generating a reachable boundary using a condition of the vehicle (for example, a position, an orientation and a wheel angle), a longitudinal speed profile and steering limits of the vehicle (for example, a maximum steering angle and a minimum steering angle); and comparing the reachable boundary and the margin. The reachable boundary may comprise a second vehicle trajectory indicating a series of locations of the vehicle while traveling in a forward direction with a certain speed and using full steering limits. The reachable boundary may represent how much to the left or right the vehicle can veer when using the full steering limits given the condition of the vehicle and the longitudinal speed profile. A conclusion is made that the vehicle should steer while stopped when the reachable boundary is at any point within a threshold distance from the margin. A conclusion is made that the vehicle should not steer while stopped when the reachable boundary is at no point within the threshold distance from the margin. Steering of the vehicle may be controlled when a conclusion is made that the vehicle should steer while stopped.

The margin may comprise an object margin, a drivable area margin or a lane mark margin. The object margin can be generated by: analyzing the vehicle trajectory to identify the time interval in which a footprint of the vehicle overlaps laterally with a footprint of the object; shifting a location of the footprint of the vehicle laterally within the time interval until contact is made with the footprint of the object; and defining the first vehicle trajectory by drawing a line through a center of gravity of the vehicle footprint at each laterally shifted location of the footprint of the vehicle.

The drivable area margin and the lane mark margin may be generated by: identifying a series of locations of a footprint of the vehicle along the vehicle trajectory within the time interval; shifting the footprint of the vehicle laterally until contact is made with the boundary of the drivable area or the lane mark; and defining the first vehicle trajectory by drawing a line through a center of gravity of the vehicle footprint at each laterally shifted location of the footprint of the vehicle.

The reachable boundary may be compared to the margin when certain criteria is met. For example, the reachable boundary may be compared to the margin when the vehicle is within a threshold distance from the object, when a navigable width is greater than a threshold value, and/or when the vehicle is not parked. Otherwise, a conclusion is made that the vehicle should not steer while stopped. The navigable width may comprise a width of a free space in the drivable area through which the vehicle can fit when passing the object.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

In this document, the term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Definitions for additional terms that are relevant to this document are included at the end of this Detailed Description.

Notably, this document describes the present solution in the context of an AV. However, the present solution is not limited to AV applications. The present solution may be used in other applications such as robotic applications, radar system applications, metric applications, and/or system performance applications.

Figure 3:
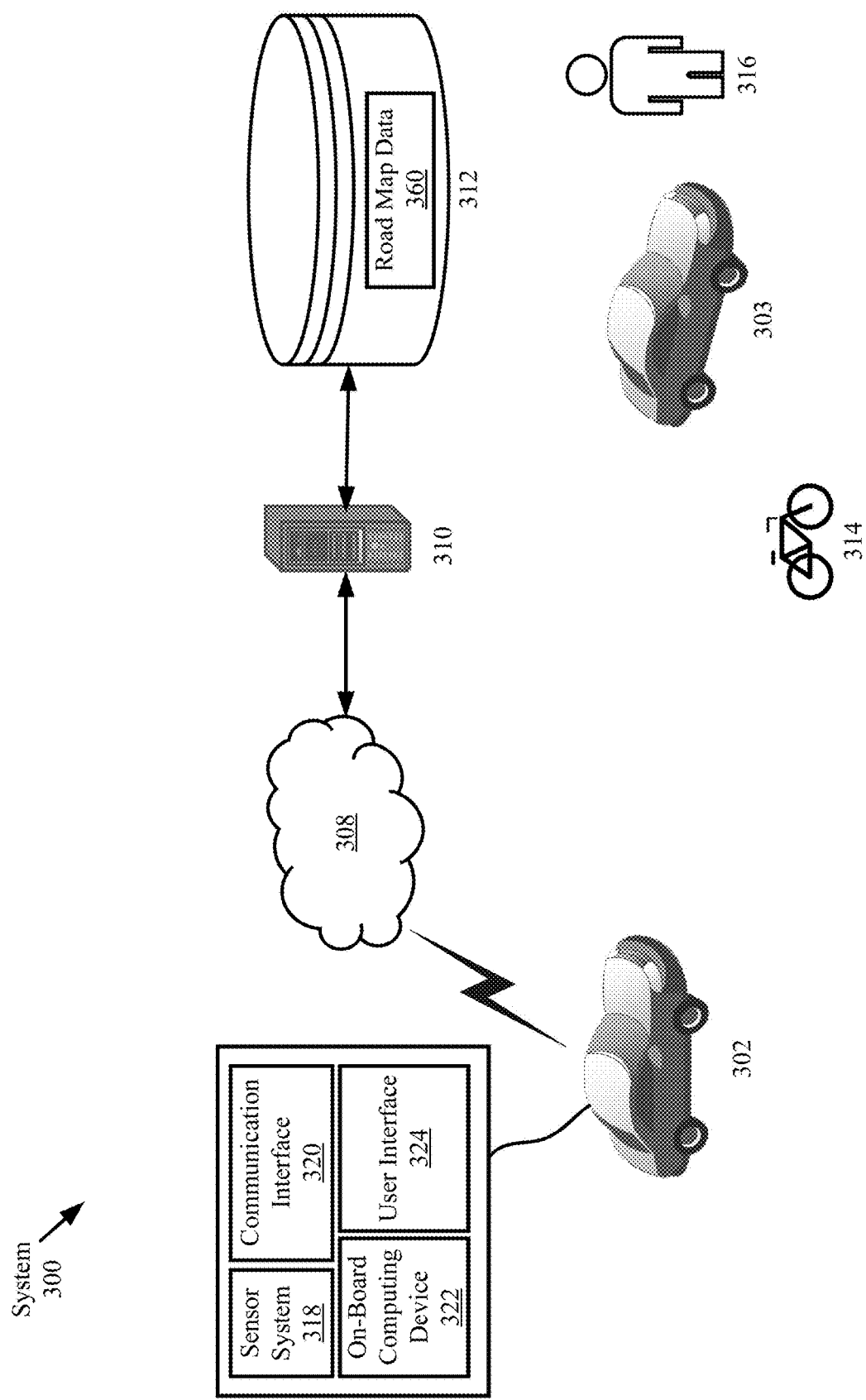
FIG. 3 illustrates a system in accordance with aspects of the disclosure.

FIG. 3 illustrates an example system 300, in accordance with aspects of the disclosure. System 300 comprises a vehicle 302 that is traveling along a road in a semi-autonomous or autonomous manner. Vehicle 302 is also referred to in this document as AV 302. AV 302 can include, but is not limited to, a land vehicle (as shown in FIG. 3), an aircraft, or a watercraft. As noted above, except where specifically noted this disclosure is not necessarily limited to AV embodiments, and it may include non-autonomous vehicles in some embodiments.

AV 302 is generally configured to detect objects in its proximity. The objects can include, but are not limited to, a vehicle 303, cyclist 314 (such as a rider of a bicycle, electric scooter, motorcycle, or the like) and/or a pedestrian 316.

As illustrated in FIG. 1, the AV 302 may include a sensor system 318, an on-board computing device 322, a communications interface 320, and a user interface 324. Autonomous vehicle system may further include certain components (as illustrated, for example, in FIG. 4) included in vehicles, which may be controlled by the on-board computing device 322 using a variety of communication signals and/or commands, such as, for example, acceleration signals or commands, deceleration signals or commands, steering signals or commands, braking signals or commands, etc.

The sensor system 318 may include one or more sensors that are coupled to and/or are included within the AV 302. For example, such sensors may include, without limitation, a lidar system, a radio detection and ranging (radar) system, a laser detection and ranging (LADAR) system, a sound navigation and ranging (sonar) system, one or more cameras (for example, visible spectrum cameras, infrared cameras, etc.), temperature sensors, position sensors (for example, a global positioning system (GPS), etc.), location sensors, fuel sensors, motion sensors (for example, an inertial measurement unit (IMU), etc.), humidity sensors, occupancy sensors, or the like. The sensor data can include information that describes the location of objects within the surrounding environment of the AV 302, information about the environment itself, information about the motion of the AV 302, information about a route of the vehicle, or the like. As AV 302 travels over a surface, at least some of the sensors may collect data pertaining to the surface.

The AV 302 may also communicate sensor data collected by the sensor system to a remote computing device 310 (for example, a cloud processing system) over communications network 308. Remote computing device 310 may be configured with one or more servers to perform one or more processes of the technology described in this document. Remote computing device 310 may also be configured to communicate data/instructions to/from AV 302 over network 308, to/from server(s) and/or datastore(s) 312. Datastore(s) 312 may include, but are not limited to, database(s).

Network 308 may include one or more wired or wireless networks. For example, the network 308 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 302 may retrieve, receive, display, and edit information generated from a local application or delivered via network 308 from datastore 312. Datastore 312 may be configured to store and supply raw data, indexed data, structured data, road map data 360, program instructions or other configurations as is known.

The communications interface 320 may be configured to allow communication between AV 302 and external systems, such as, for example, external devices, sensors, other vehicles, servers, data stores, databases, etc. The communications interface 320 may utilize any now or hereafter known protocols, protection schemes, encodings, formats, packaging, etc. such as, without limitation, Wi-Fi, an infrared link, Bluetooth, etc. The user interface system 324 may be part of peripheral devices implemented within the AV 302 including, for example, a keyboard, a touch screen display device, a microphone, and a speaker, etc. The vehicle also may receive state information, descriptive information or other information about devices or objects in its environment via the communication interface 320 over communication links such as those known as vehicle-to-vehicle, vehicle-to-object or other V2X communication links. The term "V2X" refers to a communication between a vehicle and any object that the vehicle may encounter or affect in its environment.

Figure 4:
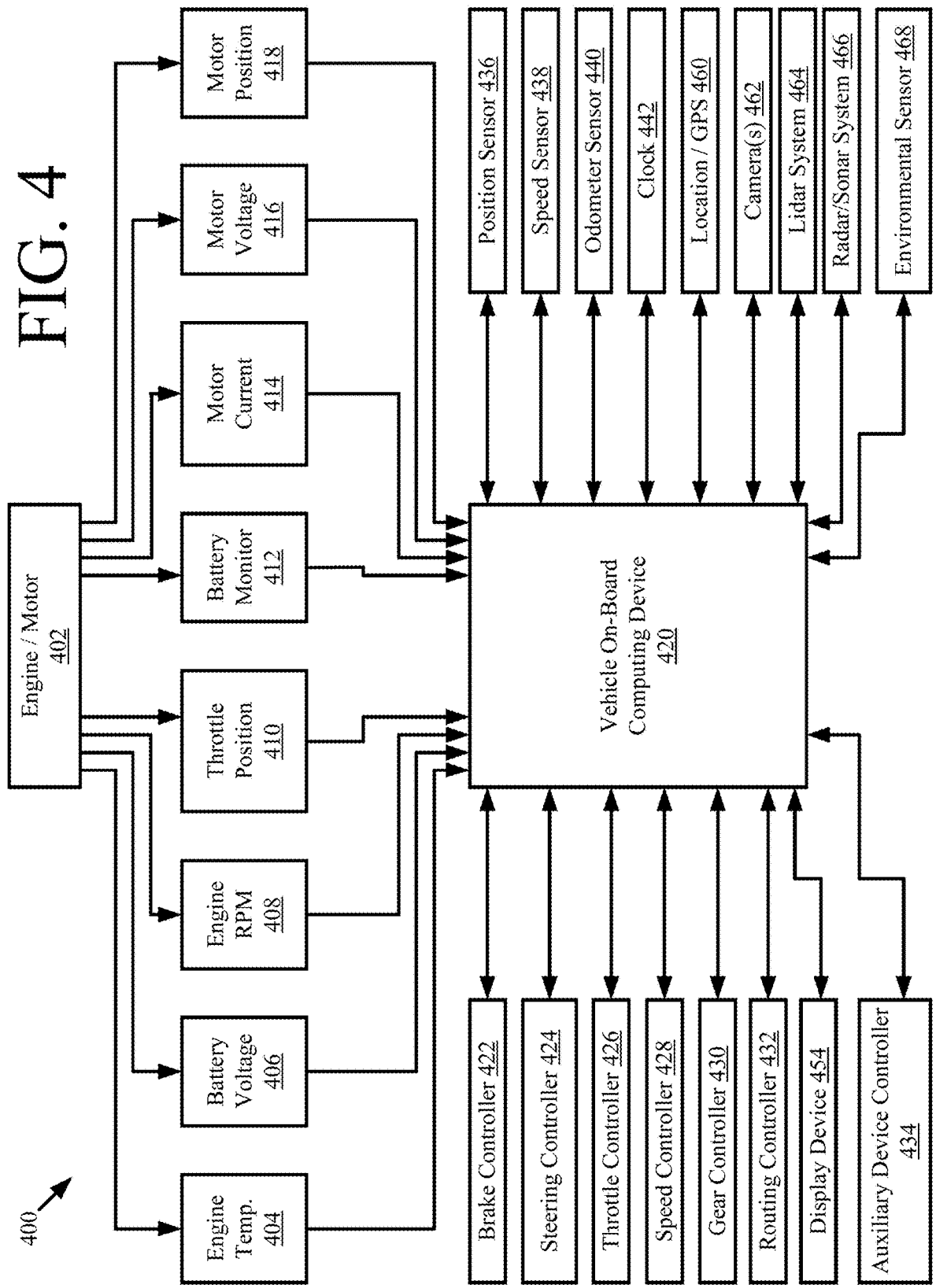
FIG. 4 illustrates an example architecture for a vehicle, in accordance with aspects of the disclosure.

FIG. 4 illustrates an example system architecture 400 for a vehicle, in accordance with aspects of the disclosure. Vehicles 302 and/or 303 of FIG. 3 can have the same or similar system architecture as that shown in FIG. 4. Thus, the following discussion of system architecture 400 is sufficient for understanding vehicle(s) 302, 303 of FIG. 3. However, other types of vehicles are considered within the scope of the technology described in this document and may contain more or less elements as described in association with FIG. 4. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 4, system architecture 400 for a vehicle includes an engine or motor 402 and various sensors 404-418 for measuring various parameters of the vehicle. In gas-powered or hybrid vehicles having a fuel-powered engine, the sensors may include, for example, an engine temperature sensor 404, a battery voltage sensor 406, an engine revolutions per minute (RPM) sensor 408, and a throttle position sensor 410. If the vehicle is an electric or hybrid vehicle, then the vehicle may have an electric motor, and accordingly includes sensors such as a battery monitoring system 412 (to measure current, voltage and/or temperature of the battery), motor current 414 and voltage 416 sensors, and motor position sensors 418 such as resolvers and encoders.

Operational parameter sensors that are common to both types of vehicles include, for example: a position sensor 436 such as an accelerometer, gyroscope and/or inertial measurement unit; a speed sensor 438; and an odometer sensor 440. The vehicle also may have a clock 442 that the system uses to determine vehicle time during operation. The clock 442 may be encoded into the vehicle on-board computing device, it may be a separate device, or multiple clocks may be available.

The vehicle also may include various sensors that operate to gather information about the environment in which the vehicle is traveling. These sensors may include, for example: a location sensor 460 (such as a Global Positioning System (GPS) device); object detection sensors such as one or more cameras 462; a lidar system 464; and/or a radar and/or a sonar system 466. The sensors also may include environmental sensors 468 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 420. The vehicle on-board computing device 420 may be implemented using the computer system of FIG. 18. The vehicle on-board computing device 420 analyzes the data captured by the sensors and optionally controls operations of the vehicle based on results of the analysis. For example, the vehicle on-board computing device 420 may control: braking via a brake controller 422; direction via a steering controller 424; speed and acceleration via a throttle controller 426 (in a gas-powered vehicle) or a motor speed controller 428 (such as a current level controller in an electric vehicle); a differential gear controller 430 (in vehicles with transmissions); and/or other controllers. Auxiliary device controller 434 may be configured to control one or more auxiliary devices, such as testing systems, auxiliary sensors, mobile devices transported by the vehicle, etc.

Geographic location information may be communicated from the location sensor 460 to the vehicle on-board computing device 420, which may then access a map of the environment that corresponds to the location information to determine known fixed features of the environment such as streets, buildings, stop signs and/or stop/go signals. Captured images from the cameras 462 and/or object detection information captured from sensors such as lidar system 464 is communicated from those sensors) to the vehicle on-board computing device 420. The object detection information and/or captured images are processed by the vehicle on-board computing device 420 to detect objects in proximity to the vehicle. Any known or to be known technique for making an object detection based on sensor data and/or captured images can be used in the embodiments disclosed in this document.

Lidar information is communicated from lidar system 464 to the vehicle on-board computing device 420. Additionally, captured images are communicated from the camera(s) 462 to the vehicle on-board computing device 420. The lidar information and/or captured images are processed by the vehicle on-board computing device 420 to detect objects in proximity to the vehicle. The manner in which the object detections are made by the vehicle on-board computing device 420 includes such capabilities detailed in this disclosure.

In addition, the system architecture 400 may include an onboard display device 454 that may generate and output an interface on which sensor data, vehicle status information, or outputs generated by the processes described in this document are displayed to an occupant of the vehicle. The display device may include, or a separate device may be, an audio speaker that presents such information in audio format.

The vehicle on-board computing device 420 may include and/or may be in communication with a routing controller 432 that generates a navigation route from a start position to a destination position for an autonomous vehicle. The routing controller 432 may access a map data store to identify possible routes and road segments that a vehicle can travel on to get from the start position to the destination position. The routing controller 432 may score the possible routes and identify a preferred route to reach the destination. For example, the routing controller 432 may generate a navigation route that minimizes Euclidean distance traveled or other cost function during the route, and may further access the traffic information and/or estimates that can affect an amount of time it will take to travel on a particular route. Depending on implementation, the routing controller 432 may generate one or more routes using various routing methods, such as Dijkstra's algorithm, Bellman-Ford algorithm, or other algorithms. The routing controller 432 may also use the traffic information to generate a navigation route that reflects expected conditions of the route (for example, current day of the week or current time of day, etc.), such that a route generated for travel during rush-hour may differ from a route generated for travel late at night. The routing controller 432 may also generate more than one navigation route to a destination and send more than one of these navigation routes to a user for selection by the user from among various possible routes.

In various embodiments, the vehicle on-board computing device 420 may determine perception information of the surrounding environment of the AV. Based on the sensor data provided by one or more sensors and location information that is obtained, the vehicle on-board computing device 420 may determine perception information of the surrounding environment of the AV. The perception information may represent what an ordinary driver would perceive in the surrounding environment of a vehicle. The perception data may include information relating to one or more objects in the environment of the AV. For example, the vehicle on-board computing device 420 may process sensor data (for example, lidar or radar data, camera images, etc.) in order to identify objects and/or features in the environment of AV. The objects may include traffic signals, roadway boundaries, other vehicles, pedestrians, and/or obstacles, etc. The vehicle on-board computing device 420 may use any now or hereafter known object recognition algorithms, video tracking algorithms, and computer vision algorithms (for example, track objects frame-to-frame iteratively over a number of time periods) to determine the perception.

In some embodiments, the vehicle on-board computing device 420 may also determine, for one or more identified objects in the environment, the current state of the object. The state information may include, without limitation, for each object: current location; current speed and/or acceleration, current heading; current pose; current shape, size, or footprint; type (for example: vehicle, pedestrian, bicycle, static object or obstacle); and/or other state information.

The vehicle on-board computing device 420 may perform one or more prediction and/or forecasting operations. For example, the vehicle on-board computing device 420 may predict future locations, trajectories, and/or actions of one or more objects. For example, the vehicle on-board computing device 420 may predict the future locations, trajectories, and/or actions of the objects based at least in part on perception information (for example, the state data for each object comprising an estimated shape and pose determined as discussed below), location information, sensor data, and/or any other data that describes the past and/or current state of the objects, the AV, the surrounding environment, and/or their relationship(s). For example, if an object is a vehicle and the current driving environment includes an intersection, the vehicle on-board computing device 420 may predict whether the object will likely move straight forward or make a turn. If the perception data indicates that the intersection has no traffic light, the vehicle on-board computing device 420 may also predict whether the vehicle may have to fully stop prior to entering the intersection.

In various embodiments, the vehicle on-board computing device 420 may determine a motion plan for the autonomous vehicle. For example, the vehicle on-board computing device 420 may determine a motion plan for the autonomous vehicle based on the perception data and/or the prediction data. Specifically, given predictions about the future locations of proximate objects and other perception data, the vehicle on-board computing device 420 can determine a motion plan for the AV that best navigates the autonomous vehicle relative to the objects at their future locations.

In some embodiments, the vehicle on-board computing device 420 may receive predictions and make a decision regarding how to handle objects and/or actors in the environment of the AV. For example, for a particular actor (for example, a vehicle with a given speed, direction, turning angle, etc.), the vehicle on-board computing device 420 decides whether to overtake, yield, stop, and/or pass based on, for example, traffic conditions, map data, state of the autonomous vehicle, etc. Furthermore, the vehicle on-board computing device 420 also plans a path for the AV to travel on a given route, as well as driving parameters (for example, distance, speed, and/or turning angle). That is, for a given object, the vehicle on-board computing device 420 decides what to do with the object and determines how to do it. For example, for a given object, the vehicle on-board computing device 420 may decide to pass the object and may determine whether to pass on the left side or right side of the object (including motion parameters such as speed). The vehicle on-board computing device 420 may also assess the risk of a collision between a detected object and the AV. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (for example, N milliseconds). If the collision can be avoided, then the vehicle on-board computing device 420 may execute one or more control instructions to perform a cautious maneuver (for example, mildly slow down, accelerate, change lane, or swerve). In contrast, if the collision cannot be avoided, then the vehicle on-board computing device 420 may execute one or more control instructions for execution of an emergency maneuver (for example, brake and/or change direction of travel).

As discussed above, planning and control data regarding the movement of the autonomous vehicle is generated for execution. The vehicle on-board computing device 420 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 5:
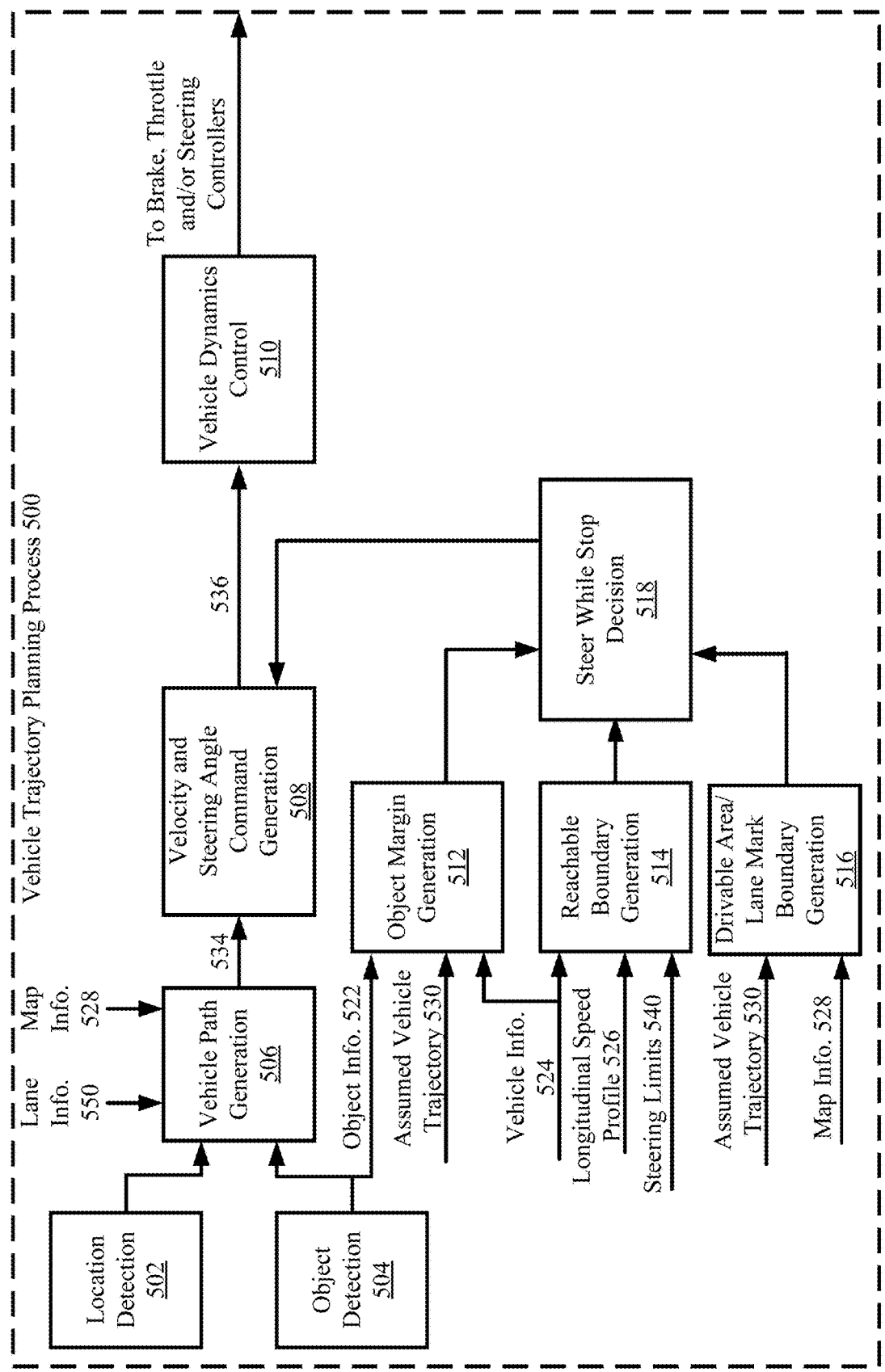
FIG. 5 illustrates how a vehicle may be controlled in accordance with aspects of the disclosure.

FIG. 5 provides a block diagram that is useful for understanding how control of a vehicle is achieved in accordance with the present solution. All of the operations performed in blocks 502-518 can be performed by the on-board computing device of a vehicle (for example, AV 302 of FIG. 3).

In block 502, a location of the vehicle is detected. This detection can be made based on sensor data output from a location sensor (for example, location sensor 460 of FIG. 4) of the vehicle. This sensor data can include, but is not limited to, GPS data. The detected location of the vehicle is then passed to block 506.

In block 504, an object is detected within proximity of the vehicle. This detection is made based on sensor data output from one or more sensors (for example, sensor(s) 460-468 of FIG. 4) of the vehicle. Information about the detected object is passed to block 506. This information includes, but is not limited to, a speed of the object and/or a direction of travel of the object.

In block 506, a vehicle path 534 is generated using the information from blocks 502, 504, map information 528 which is pre-stored in a data store of the vehicle), lane information 550, and object information 522. The object information 522 can include, but is not limited to, trajectory prediction(s) for one or more objects. Any known or to be known technique for determining a vehicle path and/or object trajectory predictions can be used here. The vehicle path 534 represents a smooth path that does not have abrupt changes that would otherwise provide passenger discomfort. The vehicle path 534 is then provided to block 508. In block 508, velocity and steering angle commands 536 are generated based on the vehicle path 534. Any known or to be known technique for generating velocity and steering angle commands can be used here. The velocity and steering angle commands 536 are provided to block 510 for vehicle dynamics control.

As noted above, the present solution implements SWS operations. The SWS operations are implemented by blocks 512-518. Block 512 involves generating an object margin using object information 522, vehicle information 524 and an assumed vehicle trajectory 530. The object margin comprises a vehicle trajectory indicating a series of locations of the vehicle while contacting the object as the vehicle will travel past the object during a time interval. The manner in which the object margin is generated will become evident as the discussion progresses. The vehicle information 524 can include, but is not limited to, vehicle's current condition (for example, position, orientation and/or wheel angle) and/or longitudinal speed profile. The longitudinal speed profile can include, but is not limited, a list of speeds of the vehicle over a time period. This list can include one speed for the entire time period or more speeds respectively associated with different portions of the time period. The assumed vehicle trajectory 530 can include, but is not limited to, a linear path of travel that starts from the vehicle's current location and extends along a center of a lane or road.

The object information 522 can include, but is not limited to, an object classification, the object's actual speed, the object's actual direction of travel, possible direction(s) of travel, and/or possible object trajectory(ies). The object classifications can include, but are not limited to, a vehicle classification and a pedestrian classification. The vehicle class can have a plurality of vehicle sub-classes. The vehicle sub-classes can include, but are not limited to, a bicycle sub-class, a motorcycle sub-class, a skateboard sub-class, a roller blade sub-class, a scooter sub-class, a sedan sub-class, an SUV sub-class, and/or a truck sub-class. The object classification is made based on sensor data output from sensor(s) of the vehicle. Any known or to be known object classification technique can be used here. The possible object trajectories can include, but are not limited to, the following trajectories: a trajectory defined by the object's actual speed (for example, 1 mile per hour) and actual direction of travel (for example, west); a trajectory defined by the object's actual speed (for example, 1 mile per hour) and another possible direction of travel (for example, south, south-west, or X (for example, 40°) degrees from the object's actual direction of travel in a direction towards the AV) for the object; a trajectory defined by another possible speed for the object (for example, 2-10 miles per hour) and the object's actual direction of travel (for example, west); and/or a trajectory defined by another possible speed for the object (for example, 2-10 miles per hour) and another possible direction of travel (for example, south, south-west, or X (for example, 40°) degrees from the object's actual direction of travel in a direction towards the AV) for the object. The possible speed(s) and/or possible direction(s) of travel may be pre-defined for objects in the same class and/or sub-class as the object.

Block 514 involves generating one or more reachable boundaries for the vehicle using the vehicle information 524, the longitudinal speed profile 526 and steering limits 540. A reachable boundary comprises indicating a series of locations of the vehicle while traveling in a forward direction with a certain speed and using full steering limits. Left and right reachable boundaries may be generated in block 514. In this case, each reachable boundary represents how much to the left or right the vehicle can veer when using the full steering limits given the vehicle's current condition and longitudinal speed profile. A vehicle model may be used to generate the reachable boundaries. A sequence of steering wheel angle magnitudes may be input into the vehicle model, and lateral offsets of the vehicle from reference point(s) may be output from the vehicle model. The sequence is derived from AV current state (current steering wheel angle magnitude and rate) well as a max SWA magnitude, rate and acceleration per longitudinal speed. The lateral offsets comprise multiple points that can be connected via a line to define a reachable boundary.

Block 516 involves generating a drivable area boundary and/or lane mark boundary using the assumed vehicle trajectory 530 and map information 528. The manner in which these margins are generated will become evident as the discussion progresses. A drivable area boundary comprises a vehicle trajectory going forward with a certain heading while touching or other being adjacent to a perimeter edge of a drivable area. A lane mark boundary comprises a vehicle trajectory going forward with a certain speed while touching or otherwise being adjacent to a lane mark.

Block 518 involves determining whether the vehicle should steer while stopped based on the object margin, the reachable boundary(ies), the drivable area margin, and/or the lane mark boundary. The result of this decision is communicated from block 518 to block 508. At block 508, the vehicle trajectory 534 may be modified to facilitate the vehicle's steering while stopped. The manner in which this determination is made will be discussed in detail below in relation to FIG. 6.

Figure 6:
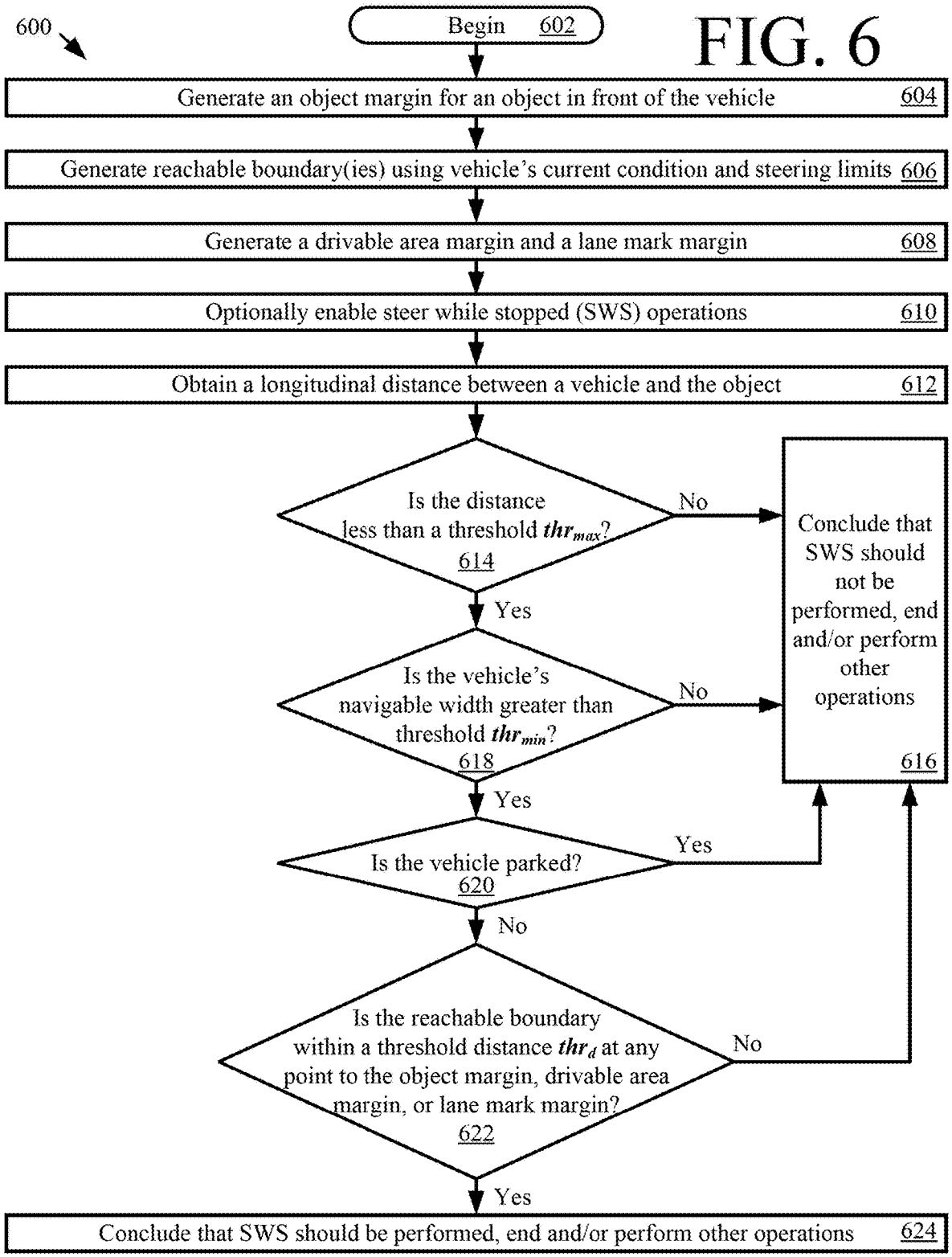
FIG. 6 illustrates a method for operating a vehicle.

FIG. 6 provides a flow diagram of an illustrative method 600 for controlling an AV (for example, AV 302 of FIG. 3). All or some of the operations of method 600 can be performed by an onboard computing device (for example, onboard computing device 322 of FIGS. 3 and/or 420 of FIG. 4) of the AV and/or a remote computing device (for example, server 310 of FIG. 3). Some of the operations of method 600 can be performed in a different order than that shown in FIG. 6 in accordance with a given application of the present solution.

Figure 7:
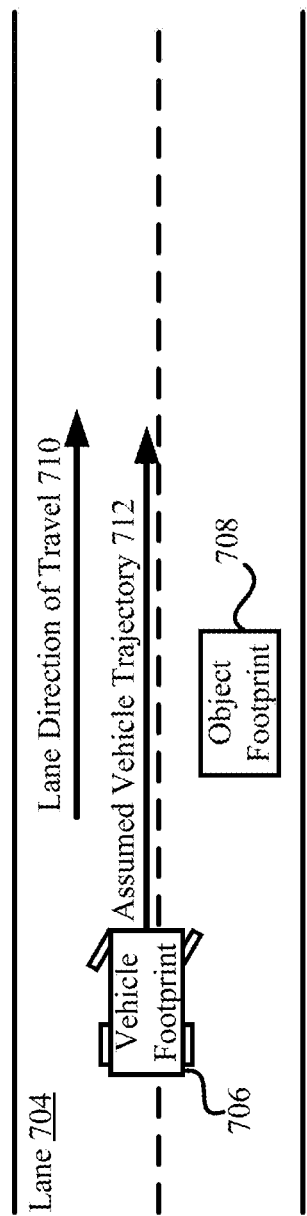
FIG. 7 provides an illustration showing a vehicle footprint and an object footprint overlaid on a lane of a road map.
Figure 8:
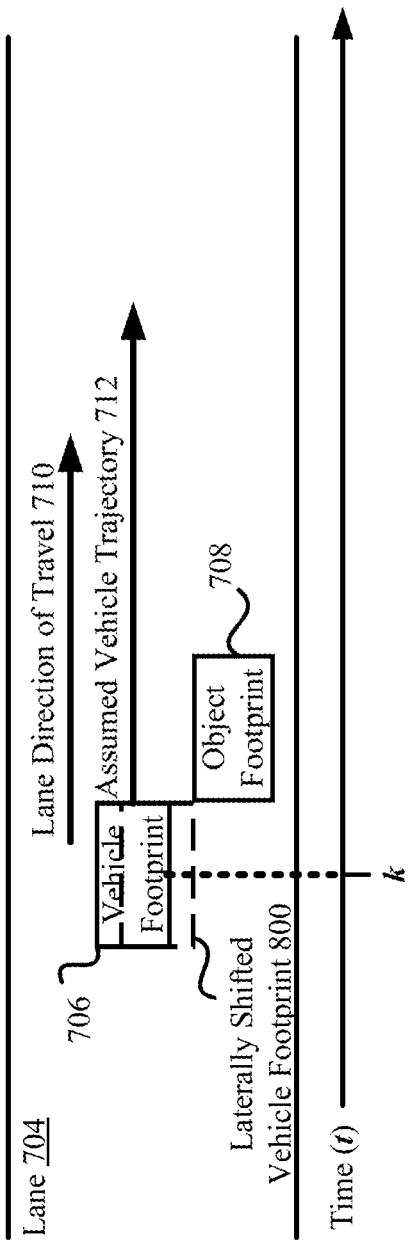
FIGS. 8-9 illustrates how a time interview may be obtained.
Figure 9:
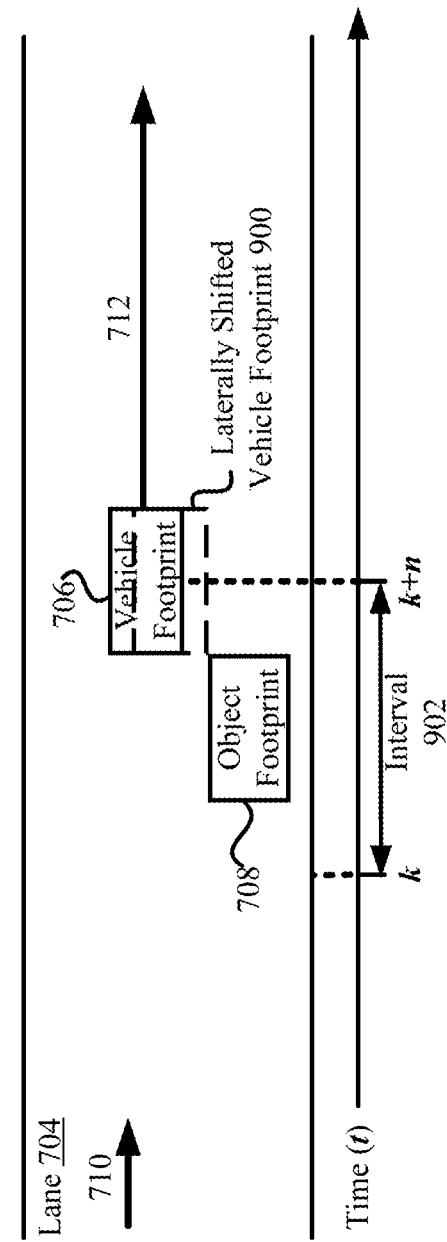
Figure 10:
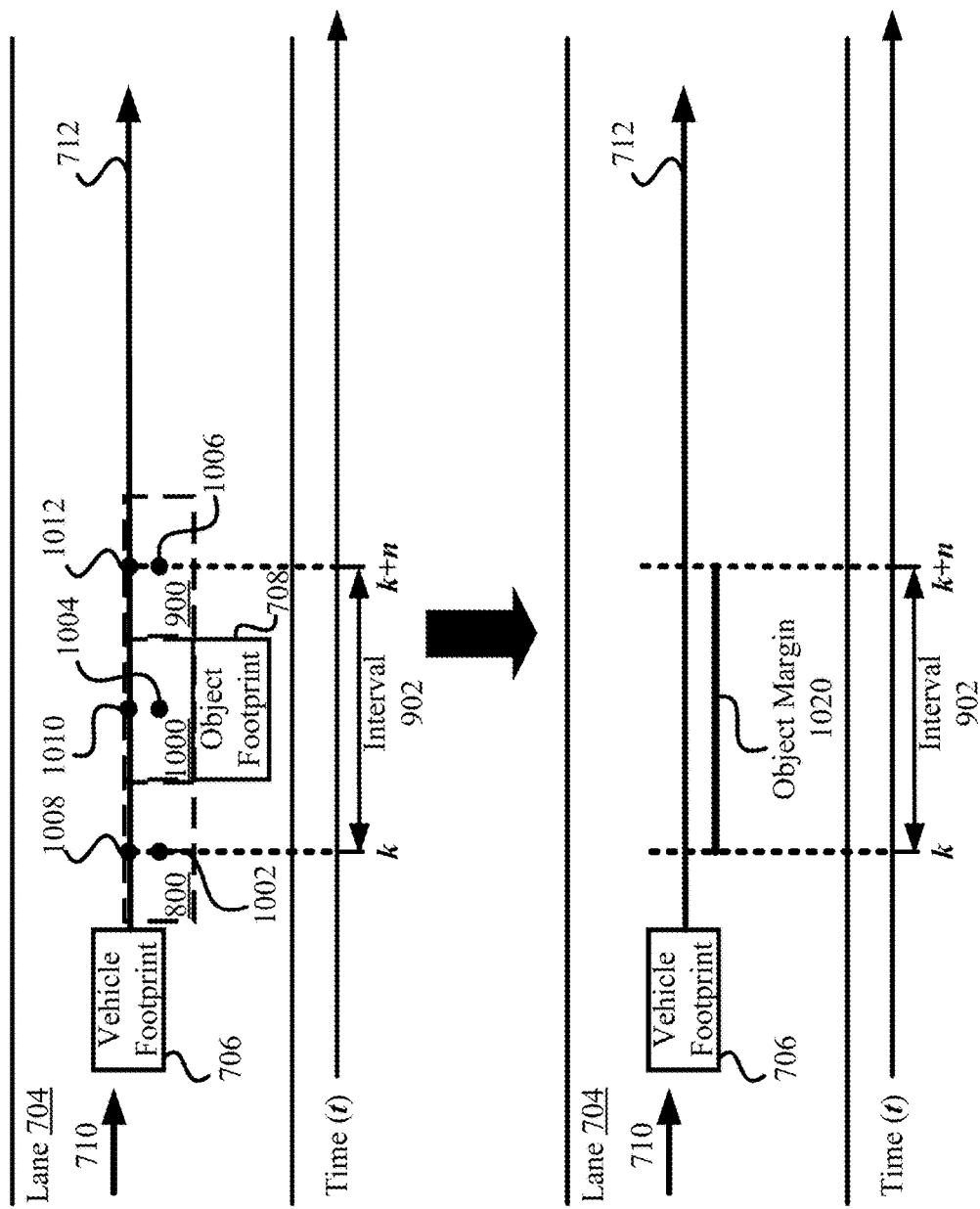
FIG. 10 illustrates how an object margin may be generated.

Method 600 begins with 602 and continues with 604 where an object margin is generated for an object in front of a vehicle. The manner in which the object margin is generated will be described in relation to FIGS. 7-10. FIG. 7 shows a vehicle footprint 706 for the vehicle (for example, vehicle 302 of FIG. 3) and an object footprint 708 for an object in front of the vehicle (for example, object 303, 314 or 316 of FIG. 3) overlaid on a lane 704 of a road map. The lane has a direction of travel 710. The vehicle has an assumed vehicle trajectory 712. The assumed vehicle trajectory 712 is used to determine a time interval 902 is shown in FIG. 9 with a start time k and an end time k+n. The start time k is the first time at which the vehicle footprint 706 overlaps laterally with the object footprint 708 as shown in FIG. 8, while the end time k+n is the last time at which the vehicle footprint 706 overlaps laterally with the object footprint 708 as shown in FIG. 9. The lateral overlapping is determined by laterally shifting the vehicle footprint until the laterally shifted vehicle footprint 800, 900 comes in contact with the object footprint 718 as shown in FIGS. 8-9. Once the time interval 902 is identified, an object margin is generated by laterally shifting the vehicle footprint 706 along its heading at each point in the time interval until it intersects with the object footprint 708. The object margin is defined by a sequence of the vehicle's center of gravity (CoG) at the vehicle footprint's laterally shifted locations. For example, as shown in FIG. 10, there are three points 1002, 1004, 1006 in the time interval 902. The vehicle footprint 706 is laterally shifted at each point 1002, 1004, 1006 in a direction towards the object footprint 708 until the vehicle footprint comes in contact with the object footprint. The laterally shifted vehicle footprint 800 is associated with point 1002. The vehicle's CoG at the location of the laterally shifted vehicle footprint 800 is shown by dot 1008. The laterally shifted vehicle footprint 1000 is associated with point 1004, and the vehicle's CoG at the location of the laterally shifted vehicle footprint 1000 is shown by dot 1010. The laterally shifted vehicle footprint 900 is associated with point 1006, and the vehicle's CoG at the location of the laterally shifted vehicle footprint 900 is shown by dot 1012. The object margin 1020 is defined by a line passing through points 1008, 1010, 1012. The present solution is not limited to the particulars of FIGS. 7-10.

Figure 11:
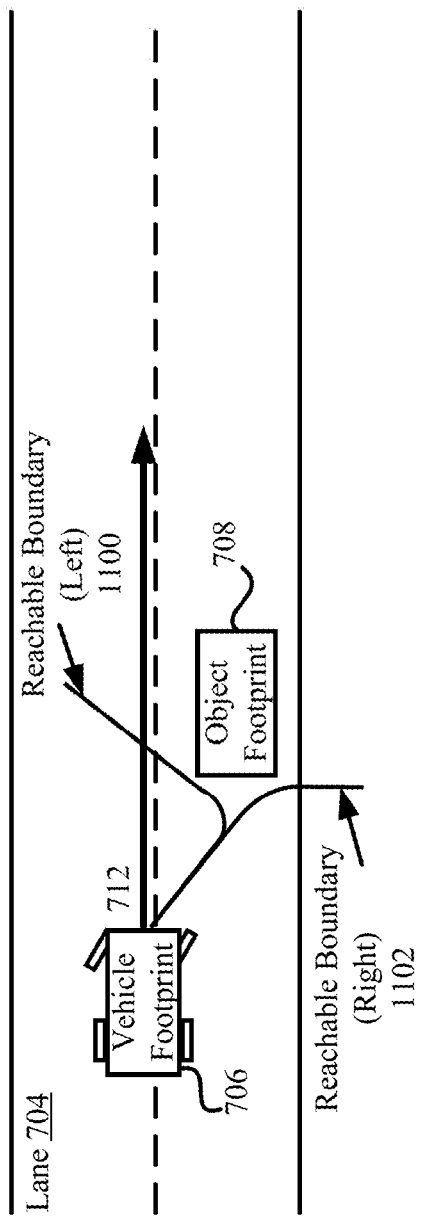
FIG. 11 provides an illustration showing a left reachable boundary and a right reachable boundary for a vehicle with an object in front thereof.

Referring again to FIG. 6, one or more reachable boundaries are generated in 606 using the vehicle's current condition (for example, vehicle information 524 of FIG. 5), the vehicle's longitudinal speed profile (for example, longitudinal speed profile 526 of FIG. 5) and steering limits (for example, steering limits 540 of FIG. 8). A reachable boundary comprises a vehicle trajectory going forward with a certain speed and using full steering limits. Left and right reachable boundaries may be generated in block 606. In this case, each reachable boundary represents how much to the left or right the vehicle can veer when using the full steering limits given the vehicle's current condition and longitudinal speed profile. Illustrative right and left reachable boundaries 1100, 1102 are shown in FIG. 11. A vehicle model may be used to generate the reachable boundaries. A steering wheel angle magnitude may be input into the vehicle model, and lateral offsets of the vehicle from reference point(s) (for example, points along the vehicle's assumed trajectory 712) may be output from the vehicle model. The lateral offsets comprise multiple points that can be connected via a line to define a reachable boundary.

Figure 12:
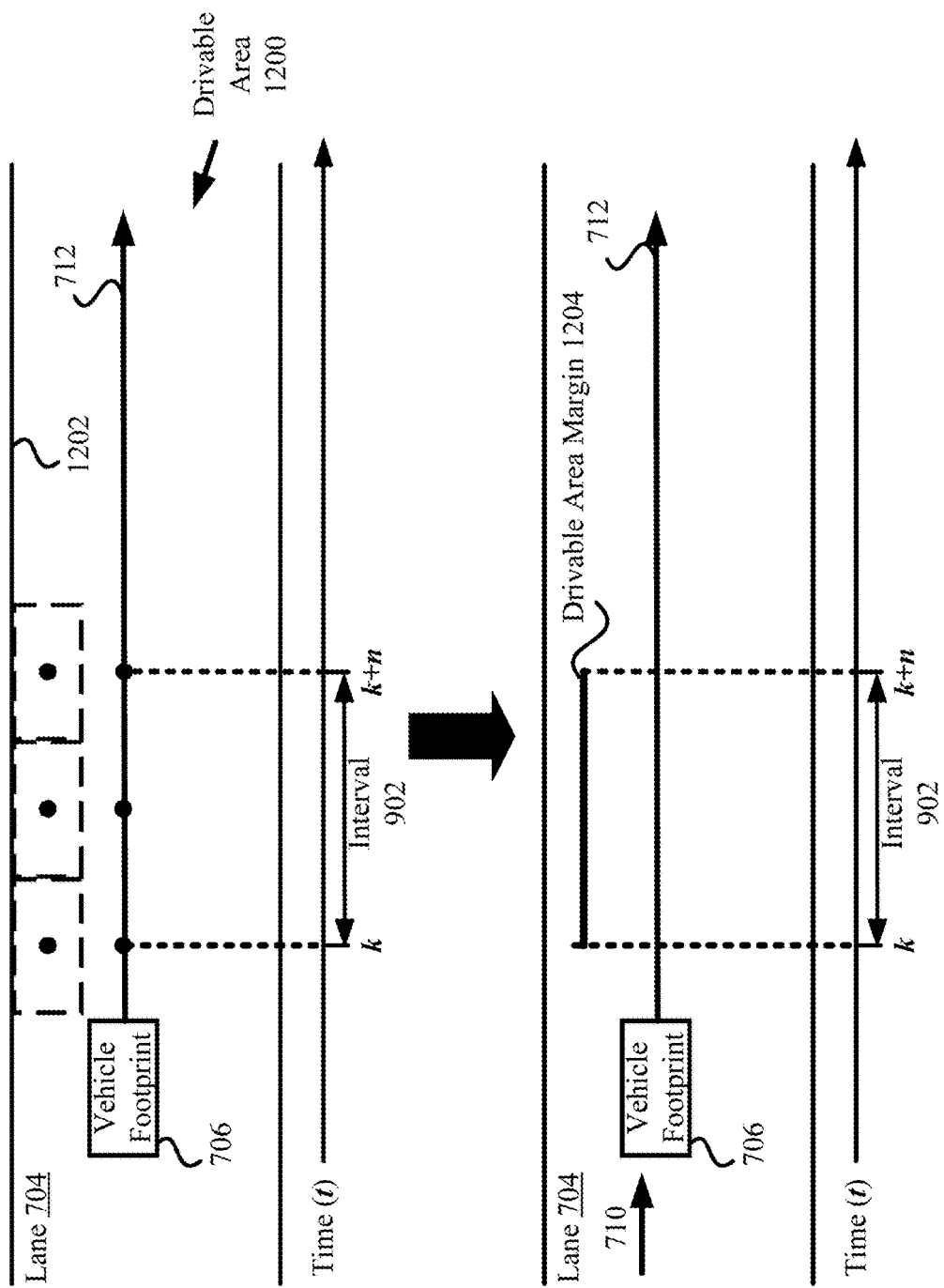
FIG. 12 illustrates how a drivable area margin may be generated.
Figure 13:
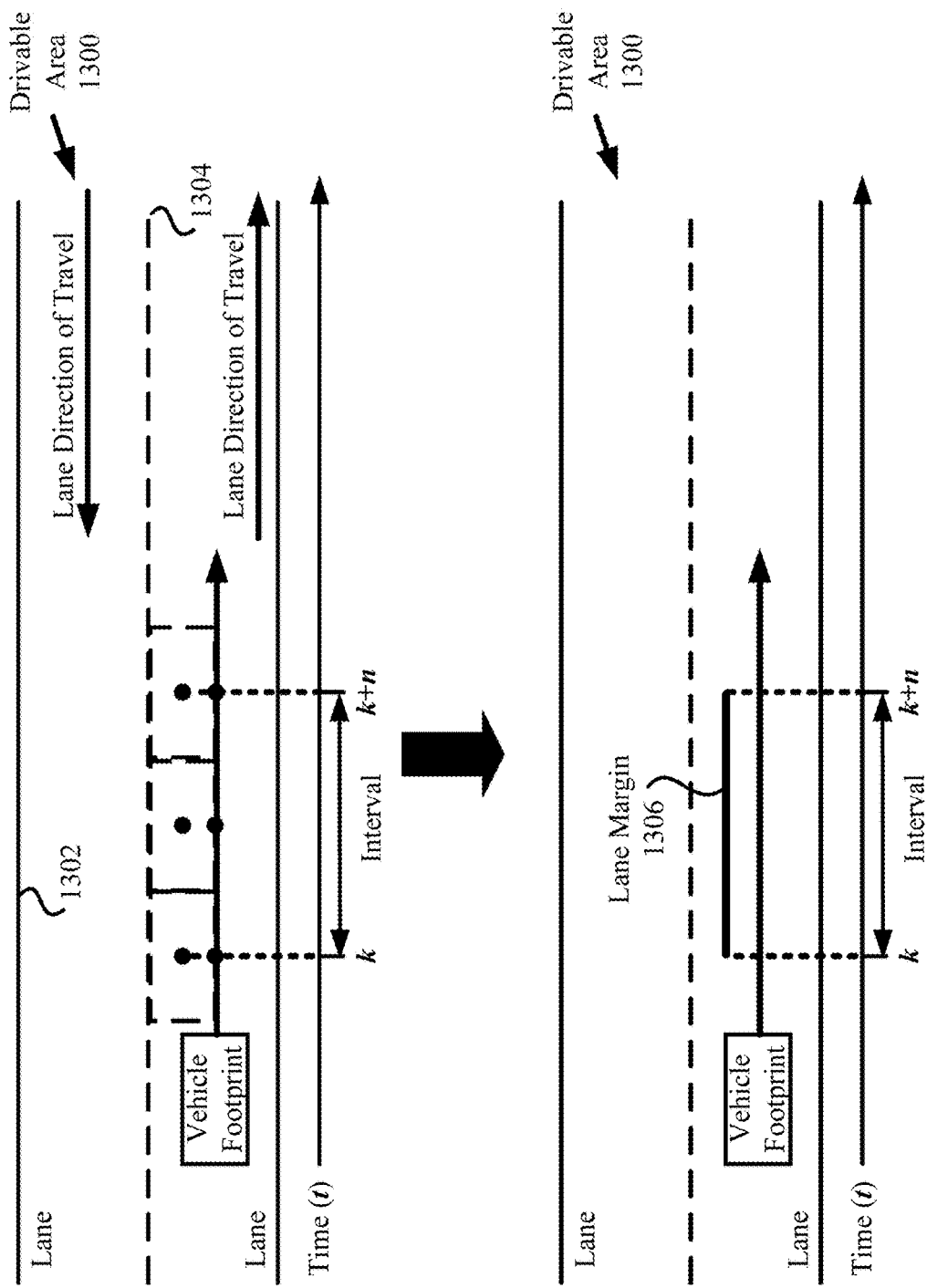
FIG. 13 illustrates how a lane mark margin may be generated.

In 608 of FIG. 6, drivable area margins and/or a lane mark margin are generated. These margins are generated in a manner similar to that used to generate the object margin, i.e., by laterally shifting the vehicle footprint 706 until the laterally shifted vehicle footprint comes in contact with a boundary line of the drivable area or a lane mark. The vehicle footprint 706 is laterally shifted along its heading at each point in the time interval 902 until it intersects with the boundary line of the drivable area or a lane mark. Each of the drivable area and lane mark margins is defined by a sequence of the vehicle's CoG at the vehicle footprint's laterally shifted locations. An illustrative drivable area margin 1204 relative to a boundary line 1202 of drivable area 1200 is shown in FIG. 12. The drivable area comprises the area in the lane 704. The drivable area can include any area in which the vehicle can drive in accordance with known or assumed road or traffic rules. In this scenario, the boundary line 1202 of the drivable area also comprises a lane mark for lane 704. In other scenarios, this is not the case as shown in FIG. 13 where the boundary line 1302 does not comprise a lane mark 1304. The lane mark 1304 is separate and apart from the boundary line 1302. Thus, the lane margin 1306 is generated relative to the lane mark 1304 in addition to or as an alternative to the boundary line 1302 of the drivable area 1300.

Figure 14:
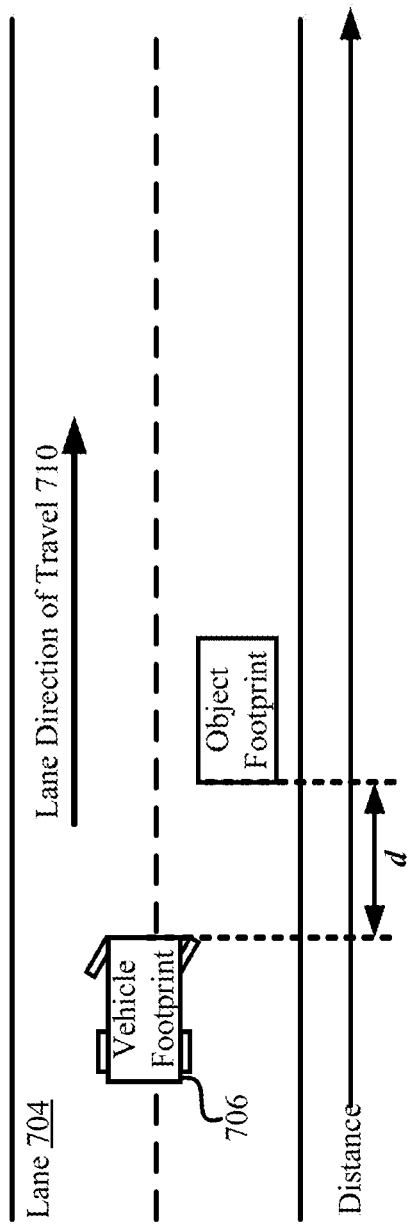
FIG. 14 provides an illustration showing a distance between a vehicle footprint and an object footprint.

Upon completing 608, method 600 continues with optional 610 where SWS operations are enabled. In block 612, a longitudinal distance between the vehicle and the object is obtained. An illustrative longitudinal distance d is shown in FIG. 14. The longitudinal distance d is compared to a threshold $thr_{max}$ in 614. Threshold $thr_{max}$ can be any number greater than zero (for example, 1-10 feet or meters). If the distance is greater than the threshold (i.e., $d \geq thr_{max}$) [614:NO], then method 600 continues with 616 where the system concludes that SWS operations should not be performed. Method 600 may thereafter end or continue with other operations (for example, return to 602).

Figure 15:
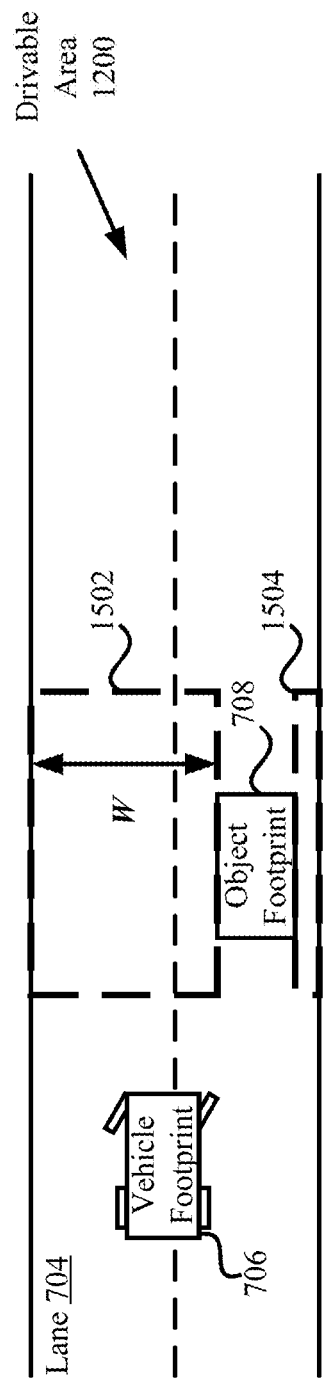
FIG. 15 provides an illustration showing free space in a drivable area.

In contrast, if the distance is less than the threshold (i.e., $d < thr_{max}$) [614:YES], then method 600 continues with 618 where a decision is made as to whether the vehicle's navigable width is greater than a threshold $thr_{min}$. Threshold $thr_{min}$ can be any number greater than zero (for example, 5-10 feet or meters). The vehicle's navigable width comprises free space in the drivable area through which the vehicle can fit when passing the object. An illustration is provided in FIG. 15 showing free space 1502, 1504 in the drivable area 1200 for the vehicle. The vehicle can fit in free space 1502 when passing the object, but is unable to fit in space 1504 when passing the object. Thus, the vehicle's navigable width W comprises the width of free space 1502. When the vehicle's navigable width is less than the threshold (for example, $W < thr_{min}$) [618:NO], method 600 continues with 616 where the system concludes that SWS operations should not be performed. Method 600 may thereafter end or continue with other operations (for example, return to 602).

In contrast, when the vehicle's navigable width is equal to or greater than the threshold (for example, $W \geq thr_{min}$) [618:YES], method 600 continues with 620 where a decision is made as to whether the vehicle is parked. If so [620:YES], then method 600 continues with 616 where the system concludes that SWS operations should not be performed.

Figure 16:
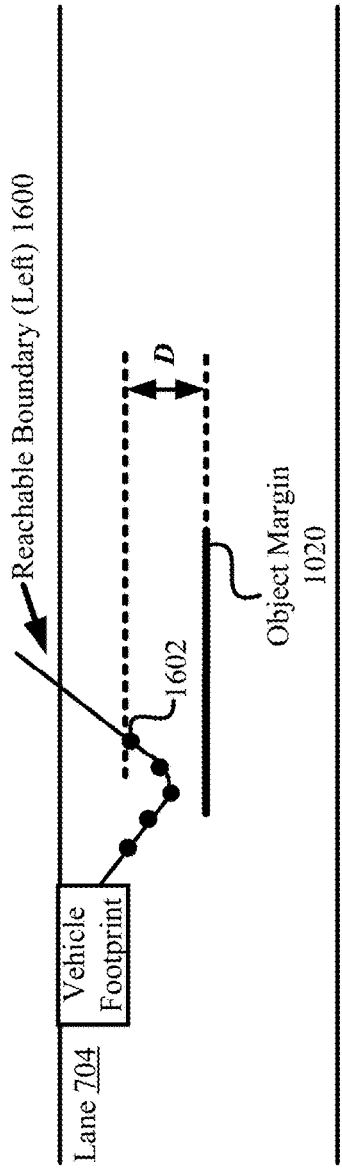
FIG. 16 provides an illustration showing a reachable boundary that is within a threshold distance from an object margin at multiple points.

If the vehicle is not parked [620:NO], then method 600 continues with 622 where a decision is made as to whether the reachable boundary is within a threshold distance $thr_d$ at any point to the object margin, a drivable area margin or a lane mark margin. An illustration is provided in FIG. 16 showing a left reachable boundary 1600 located within a threshold distance D from the object margin 1020 at one or more having points 1602 therealong.

Figure 17:
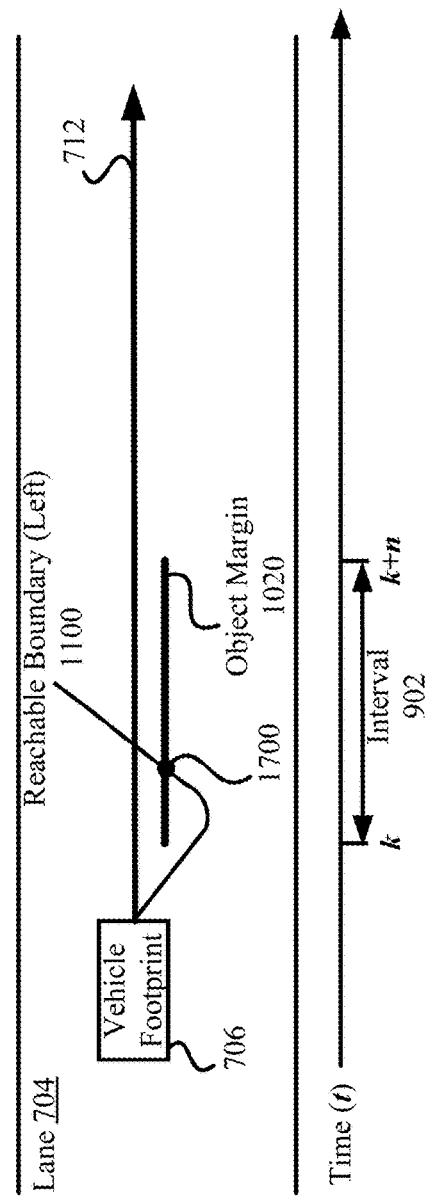
FIG. 17 provides an illustration showing a reachable boundary overlapping an object margin.

The threshold distance $thr_d$ can be zero or any greater than zero which has been selected in accordance with a given application. When the threshold distance $thr_d$ is zero, the decision of 622 can be restated as determining whether the reachable boundary overlaps the object margin, a drivable area margin or a lane mark margin. An illustration showing the left reachable boundary 1100 overlapping the object margin 1020 at point 1700 is shown in FIG. 17.

The threshold distance $thr_d$ can be pre-defined and dynamically selected or generated based on context information describing a scenario in the environment in which the vehicle is located (for example, in a parking lot or a road) and/or a classification of the object. For example, the threshold distance $thr_d$ can be larger for a pedestrian or cyclist than for a parked vehicle. The threshold distance $thr_d$ can be the same or different for the three margin types (i.e., object, drivable area and lane mark) and/or the object types (for example, vehicle, cyclist, and/or pedestrian). The left reachable boundary (for example, left reachable boundary 1100 of FIG. 11) can be used in 622 when the object is located to the right side of the vehicle, and the right reachable boundary (for example, left reachable boundary 1102 of FIG. 11) can be used in 622 when the object is located to the left side of the vehicle.

When the reachable boundary is within a threshold distance $thr_d$ at any point to one of the margins [622:NO], method 600 continues with 624 where the system concludes that SWS operations should be performed. Subsequently, method 600 ends or other operations are performed.

Figure 18:
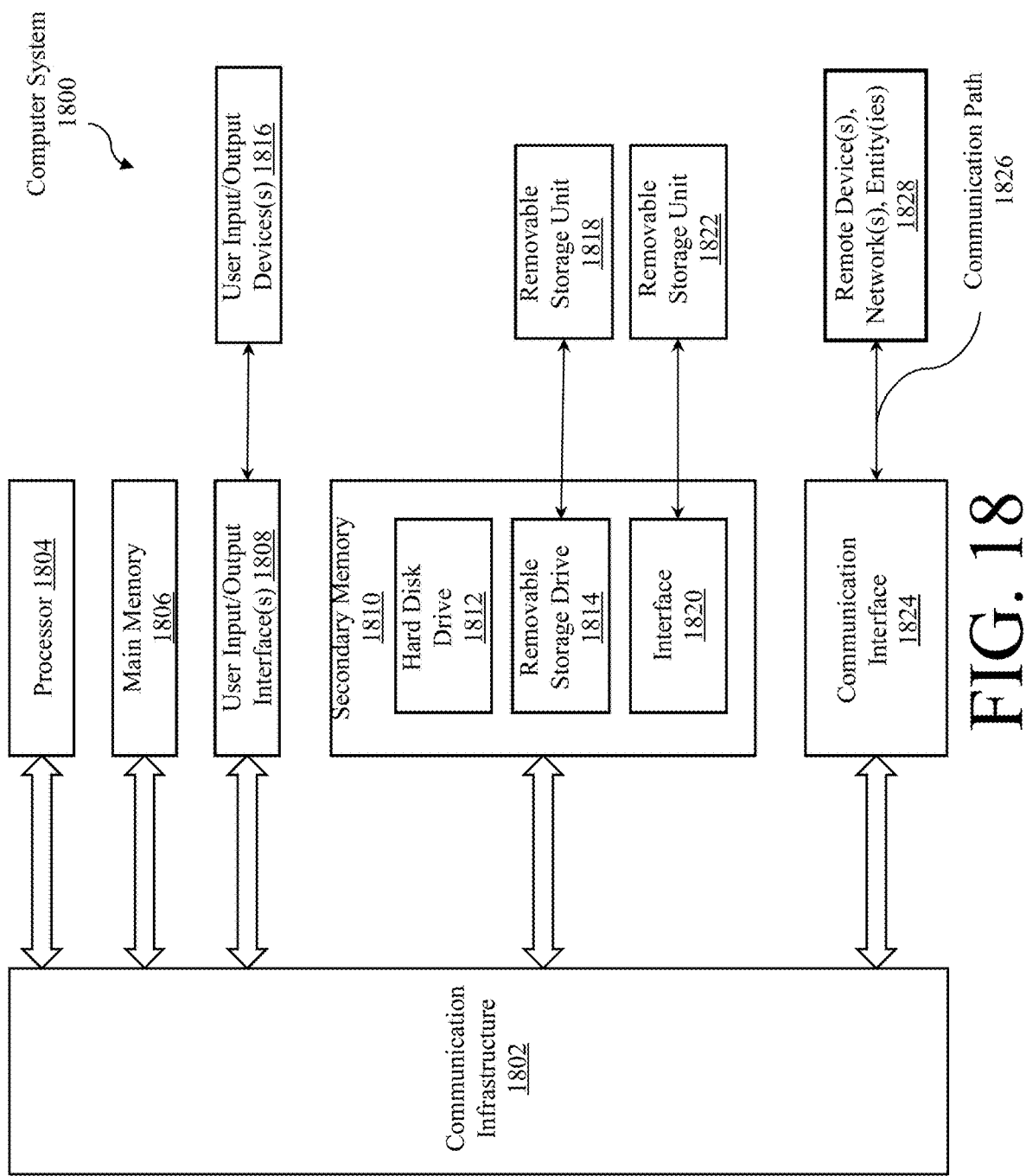
FIG. 18 illustrates a computer system useful for implementing various embodiments.

Various embodiments can be implemented, for example, using one or more computer systems, such as computer system 1800 shown in FIG. 18. Computer system 1800 can be any computer capable of performing the functions described in this document.

Computer system 1800 includes one or more processors (also called central processing units, or CPUs), such as a processor 1804. Processor 1804 is connected to a communication infrastructure or bus 1802. Optionally, one or more of the processors 1804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1800 also includes user input/output device(s) 1816, such as monitors, keyboards, pointing devices, etc., that communicate with communication infrastructure 1802 through user input/output interface(s) 1808.

Computer system 1800 also includes a main or primary memory 1806, such as random access memory (RAM). Main memory 1806 may include one or more levels of cache. Main memory 1806 has stored therein control logic (i.e., computer software) and/or data.

Computer system 1800 may also include one or more secondary storage devices or memory 1810. Secondary memory 1810 may include, for example, a hard disk drive 1812 and/or a removable storage device or drive 1814. Removable storage drive 1814 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 1814 may interact with a removable storage unit 1818. Removable storage unit 1818 includes a computer usable or readable storage device having stored thereon computer software (control logic) and/or data. Removable storage unit 1818 may be an external hard drive, a universal serial bus (USB) drive, a memory card such as a compact flash card or secure digital memory, a floppy disk, a magnetic tape, a compact disc, a DVD, an optical storage disk, and/any other computer data storage device. Removable storage drive 1814 reads from and/or writes to removable storage unit 1818 in a well-known manner.

According to an example embodiment, secondary memory 1810 may include other means, instrumentalities or other approaches for allowing computer programs and/or other instructions and/or data to be accessed by computer system 1800. Such means, instrumentalities or other approaches may include, for example, a removable storage unit 1822 and an interface 1820. Examples of the removable storage unit 1822 and the interface 1820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1800 may further include a communication or network interface 1824. Communication interface 1824 enables computer system 1800 to communicate and interact with any combination of remote devices, remote networks, remote entities, etc. (individually and collectively referenced by reference number 1828). For example, communication interface 1824 may allow computer system 1800 to communicate with remote devices 1828 over communications path 1826, which may be wired and/or wireless, and which may include any combination of LANs, WANs, the Internet, etc. Control logic and/or data may be transmitted to and from computer system 1800 via communication path 1826.

In some embodiments, a tangible, non-transitory apparatus or article of manufacture comprising a tangible, non-transitory computer useable or readable medium having control logic (software) stored thereon is also referred to in this document as a computer program product or program storage device. This includes, but is not limited to, computer system 1800, main memory 1806, secondary memory 1810, and removable storage units 1818 and 1822, as well as tangible articles of manufacture embodying any combination of the foregoing. Such control logic, when executed by one or more data processing devices (such as computer system 1800), causes such data processing devices to operate as described in this document.

Based on the teachings contained in this disclosure, it will be apparent to persons skilled in the relevant art(s) how to make and use embodiments of this disclosure using data processing devices, computer systems and/or computer architectures other than that shown in FIG. 18. In particular, embodiments can operate with software, hardware, and/or operating system implementations other than those described in this document.

Terms that are relevant to this disclosure include:

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

The term "object," when referring to an object that is detected by a vehicle perception system or simulated by a simulation system, is intended to encompass both stationary objects and moving (or potentially moving) actors, except where specifically stated otherwise by use of the term "actor" or "stationary object."

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

A "trajectory" of an actor that a vehicle's perception or prediction systems may generate refers to the predicted path that the actor will follow over a time horizon, along with the predicted speed of the actor and/or position of the actor along the path at various points along the time horizon.

In this document, the terms "street," "lane," "road" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" or "road" may represent an airway and a lane may be a portion of the airway. If the autonomous vehicle is a watercraft, then the term "street" or "road" may represent a waterway and a lane may be a portion of the waterway.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes example embodiments for example fields and applications, it should be understood that the disclosure is not limited to the disclosed examples. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described in this document. Further, embodiments (whether or not explicitly described) have significant utility to fields and applications beyond the examples described in this document.

Embodiments have been described in this document with the aid of functional building blocks illustrating the implementation of specified functions and relationships. The boundaries of these functional building blocks have been arbitrarily defined in this document for the convenience of the description. Alternate boundaries can be defined as long as the specified functions and relationships (or their equivalents) are appropriately performed. Also, alternative embodiments can perform functional blocks, steps, operations, methods, etc. using orderings different than those described in in this document.

The features from different embodiments disclosed herein may be freely combined. For example, one or more features from a method embodiment may be combined with any of the system or product embodiments. Similarly, features from a system or product embodiment may be combined with any of the method embodiments herein disclosed.

References in this document to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described in this document. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments but should be defined only in accordance with the following claims and their equivalents.

As described above, this document discloses system, method, and computer program product embodiments for operating a vehicle. The system embodiments include a processor or computing device implementing the methods for operating a vehicle. The computer program embodiments include programming instructions, for example, stored in a memory, to cause a processor to perform the data management methods described in this document. The system embodiments also include a processor which is configured to perform the methods described in this document, for example, via the programming instructions. More generally, the system embodiments include a system comprising means to perform the steps of the any of the methods described in this document.

Without excluding further possible embodiments, certain example embodiments are summarized in the following clauses.

Clause 1. A computer-implemented method for operating a vehicle, comprising: obtaining, by a processor, a vehicle trajectory for the vehicle and a location of an object in an environment; generating, by a processor, a margin comprising a first vehicle trajectory indicating a series of locations of the vehicle while contacting the object, a boundary of a drivable area or lane mark during a time interval in which the vehicle will travel past the object; generating, by the processor, a reachable boundary using a condition of the vehicle, a longitudinal speed profile and steering limits of the vehicle (wherein the reachable boundary comprises a second vehicle trajectory indicating a series of locations of the vehicle while traveling in a forward direction with a certain speed and using full steering limits); comparing, by the processor, the reachable boundary and the margin; and concluding, by the processor, that the vehicle should steer while stopped when the reachable boundary is at any point within a threshold distance from the margin or that the vehicle should not steer while stopped when the reachable boundary is at no point within the threshold distance from the margin.

Clause 2. The computer-implemented method according to Clause 1, further comprising controlling steering of the vehicle when a conclusion is made that the vehicle should steer while stopped.

Clause 3. The computer-implemented method according to Clause 1 or 2, wherein the generating the margin comprises: analyzing, by the processor, the vehicle trajectory to identify the time interval in which a footprint of the vehicle overlaps laterally with a footprint of the object; shifting a location of the footprint of the vehicle laterally within the time interval until contact is made with the footprint of the object; and defining the first vehicle trajectory by drawing a line through a center of gravity of the vehicle footprint at each laterally shifted location of the footprint of the vehicle.

Clause 4. The computer-implemented method according to any preceding Clause, wherein the generating the margin comprises: identifying, by the processor, a series of locations of a footprint of the vehicle along the vehicle trajectory within the time interval; shifting, at each said location, the footprint of the vehicle laterally until contact is made with the boundary of the drivable area or the lane mark; and defining the first vehicle trajectory by drawing a line through a center of gravity of the vehicle footprint at each laterally shifted location of the footprint of the vehicle.

Clause 5. The computer-implemented method according to any preceding Clause, wherein the condition of the vehicle comprises a position, an orientation and a wheel angle.

Clause 6. The computer-implemented method according to any preceding Clause, wherein the reachable boundary represents how much to the left or right the vehicle can veer when using the full steering limits given the condition of the vehicle and the longitudinal speed profile.

Clause 7. The computer-implemented method according to any preceding Clause, further comprising: performing said comparing when the vehicle is within a threshold distance from the object; or concluding that the vehicle should not steer while stopped when the vehicle is not within the threshold distance from the object.

Clause 8. The computer-implemented method according to any preceding Clause, further comprising: identifying, by the processor, a free space in the drivable area through which the vehicle can fit when passing the object; obtaining, by the processor, a width of the free space; and performing said comparing when the width is greater than a value.

Clause 9. The computer-implemented method according to any preceding Clause, further comprising concluding that the vehicle should not steer while stopped when the width is less than the value.

Clause 10. The computer-implemented method according to any preceding Clause, further comprising: performing said comparing when the vehicle is not parked; or concluding that the vehicle should not steer while stopped when the vehicle is parked.

Clause 11. A system comprising means for performing steps of any of the above method clauses.

Clause 12. A computer program, or a storage medium storing the computer program, comprising instructions, which when executed by one or more suitable processors cause any of the processors to perform the steps of any of the above method clauses.

What is claimed is:
1. A method for operating a vehicle, comprising:
   obtaining, by a processor, a vehicle trajectory for the vehicle and a location of an object in an environment;
   generating, by the processor, a margin comprising a first vehicle trajectory indicating a series of locations of the vehicle while contacting the object, a boundary of a drivable area or lane mark during a time interval in which the vehicle will travel past the object;

generating, by the processor, a reachable boundary using a condition of the vehicle, a longitudinal speed profile and steering limits of the vehicle, wherein the reachable boundary comprises a second vehicle trajectory indicating a series of locations of the vehicle while traveling in a forward direction with a certain speed and using full steering limits;

comparing, by the processor, the reachable boundary and the margin;

concluding, by the processor, that the vehicle should steer while stopped when the reachable boundary is at any point within a threshold distance from the margin or that the vehicle should not steer while stopped when the reachable boundary is at no point within the threshold distance from the margin; and controlling, by the processor, steering of the vehicle when a conclusion is made that the vehicle should steer while stopped.

2. The method according to claim 1, wherein the generating the margin comprises:

analyzing, by the processor, the vehicle trajectory to identify the time interval in which a footprint of the vehicle overlaps laterally with a footprint of the object;

shifting a location of the footprint of the vehicle laterally within the time interval until contact is made with the footprint of the object; and defining the first vehicle trajectory by drawing a line through a center of gravity of the vehicle footprint at each laterally shifted location of the footprint of the vehicle.

3. The method according to claim 1, wherein the generating the margin comprises:

identifying, by the processor, a series of locations of a footprint of the vehicle along the vehicle trajectory within the time interval;

shifting, at each said location, the footprint of the vehicle laterally until contact is made with the boundary of the drivable area or the lane mark; and defining the first vehicle trajectory by drawing a line through a center of gravity of the vehicle footprint at each laterally shifted location of the footprint of the vehicle.

4. The method according to claim 1, wherein the condition of the vehicle comprises a position, an orientation and a current wheel angle.

5. The method according to claim 1, wherein the reachable boundary represents how much to the left or right the vehicle can veer when using the full steering limits given the condition of the vehicle and the longitudinal speed profile.

6. The method according to claim 1, further comprising:
performing said comparing when the vehicle is within a threshold distance from the object; or
concluding that the vehicle should not steer while stopped when the vehicle is not within the threshold distance from the object.

7. The method according to claim 1, further comprising:
identifying, by the processor, a free space in the drivable area through which the vehicle can fit when passing the object;
obtaining, by the processor, a width of the free space; and
performing said comparing when the width is greater than a value.

8. The method according to claim 7, further comprising concluding that the vehicle should not steer while stopped when the width is less than the value.

9. The method according to claim 1, further comprising:
performing said comparing when the vehicle is not parked; or
concluding that the vehicle should not steer while stopped when the vehicle is parked.

10. The method according to claim 1, wherein the reachable boundary is compared to the margin the vehicle is not parked.

11. A system, comprising:
a memory; and
at least one processor coupled to the memory and configured to:
obtain a vehicle trajectory for the vehicle and a location of an object in an environment;
generate a margin comprising a first vehicle trajectory indicating a series of locations of the vehicle while contacting the object, a boundary of a drivable area or lane mark during a time interval in which the vehicle will travel past the object;
generate a reachable boundary using a condition of the vehicle, a longitudinal speed profile and steering limits of the vehicle, wherein the reachable boundary comprises a second vehicle trajectory indicating a series of locations of the vehicle while traveling in a forward direction with a certain speed and using full steering limits;
compare the reachable boundary and the margin; and
conclude that the vehicle should steer while stopped when the reachable boundary is at any point within a threshold distance from the margin or that the vehicle should not steer while stopped when the reachable boundary is at no point within the threshold distance from the margin; and
control steering of the vehicle when a conclusion is made that the vehicle should steer while stopped.

12. The system according to claim 11, wherein the margin is generated by:
analyzing the vehicle trajectory to identify the time interval in which a footprint of the vehicle overlaps laterally with a footprint of the object;
shifting a location of the footprint of the vehicle laterally within the time interval until contact is made with the footprint of the object; and
defining the first vehicle trajectory by drawing a line through a center of gravity of the vehicle footprint at each laterally shifted location of the footprint of the vehicle.

13. The system according to claim 11, wherein the margin is generated by:
identifying a series of locations of a footprint of the vehicle along the vehicle trajectory within the time interval;
shifting the footprint of the vehicle laterally until contact is made with the boundary of the drivable area or the lane mark; and
defining the first vehicle trajectory by drawing a line through a center of gravity of the vehicle footprint at each laterally shifted location of the footprint of the vehicle.

14. The system according to claim 11, wherein the condition of the vehicle comprises a position, an orientation and a wheel angle.

15. The system according to claim 11, wherein the reachable boundary represents how much to the left or right the vehicle can veer when using the full steering limits given the condition of the vehicle and the longitudinal speed profile.

16. The system according to claim 11, wherein the reachable boundary is compared to the margin when the vehicle is within a threshold distance from the object.

17. The system according to claim 11, wherein the at least one processor is further configured to:
- identify a free space in the drivable area through which the vehicle can fit when passing the object;
- obtain a width of the free space; and
- compare the reachable boundary to the margin when the width is greater than a value.

18. A non-transitory computer-readable medium that stores instructions that is configured to, when executed by at least one computing device, cause the at least one computing device to perform operations comprising:
- obtaining a vehicle trajectory for the vehicle and a location of an object in an environment;
- generating a margin comprising a first vehicle trajectory indicating a series of locations of the vehicle while contacting the object, a boundary of a drivable area or lane mark during a time interval in which the vehicle will travel past the object;
- generating a reachable boundary using a condition of the vehicle, a longitudinal speed profile and steering limits of the vehicle, wherein the reachable boundary comprises a second vehicle trajectory indicating a series of locations of the vehicle while traveling in a forward direction with a certain speed and using full steering limits;
- concluding that the vehicle should steer while stopped when the reachable boundary is at any point within a threshold distance from the margin or that the vehicle should not steer while stopped when the reachable boundary is at no point within the threshold distance from the margin; and
- controlling steering of the vehicle when a conclusion is made that the vehicle should steer while stopped.

* * * * *